US007686378B2

(12) United States Patent
Gisler et al.

(10) Patent No.: US 7,686,378 B2
(45) Date of Patent: Mar. 30, 2010

(54) POWER SWINGING SIDE DOOR SYSTEM AND METHOD

(75) Inventors: Maurice J. Gisler, Rochester Hills, MI (US); Craig A. Kollar, Sterling Heights, MI (US); Edward M Sanocki, Jr., Clawson, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 238 days.

(21) Appl. No.: 11/756,786

(22) Filed: Jun. 1, 2007

(65) Prior Publication Data

US 2008/0296927 A1 Dec. 4, 2008

(51) Int. Cl.
*B60J 5/04* (2006.01)

(52) U.S. Cl. .................................................. 296/146.4

(58) Field of Classification Search ............. 296/146.4, 296/146.1; 49/26, 27, 340, 349, 358
See application file for complete search history.

(56) References Cited

U.S. PATENT DOCUMENTS

| | | | | | |
|---|---|---|---|---|---|
| 4,980,618 | A | * | 12/1990 | Milnes et al. | 318/265 |
| 5,228,239 | A | * | 7/1993 | Heo | 49/280 |
| 5,231,253 | A | * | 7/1993 | Breed et al. | 200/61.45 R |
| 5,397,173 | A | * | 3/1995 | Bourguet | 303/2 |
| 5,495,639 | A | * | 3/1996 | Wartian | 16/79 |
| 5,588,258 | A | | 12/1996 | Wright et al. | |
| 5,956,249 | A | * | 9/1999 | Beran et al. | 700/56 |
| 6,550,839 | B2 | | 4/2003 | Rogers, Jr. et al. | |
| 7,438,346 | B1 | * | 10/2008 | Breed | 296/146.4 |
| 2004/0090083 | A1 | * | 5/2004 | Greuel et al. | 296/146.4 |
| 2005/0280284 | A1 | * | 12/2005 | McLain et al. | 296/146.1 |
| 2006/0137248 | A1 | * | 6/2006 | Ichinose | 49/340 |
| 2007/0241585 | A1 | * | 10/2007 | Shimizu | 296/146.6 |
| 2007/0266635 | A1 | * | 11/2007 | Sugiura et al. | 49/27 |
| 2007/0271851 | A1 | * | 11/2007 | Slopack | 49/358 |
| 2008/0052996 | A1 | * | 3/2008 | Sugiura | 49/28 |
| 2008/0150319 | A1 | * | 6/2008 | Ray | 296/146.1 |
| 2009/0249699 | A1 | * | 10/2009 | Yulkowski | 49/349 |

FOREIGN PATENT DOCUMENTS

| | | | | |
|---|---|---|---|---|
| JP | 2005171573 | A | * | 6/2005 |
| JP | 2007138500 | A | * | 6/2007 |
| JP | 2007205102 | A | * | 8/2007 |

* cited by examiner

*Primary Examiner*—H Gutman

(57) ABSTRACT

A vehicle is provided having an automatic swinging side door with an actuator for opening and closing the door. A controller has an algorithm for moving the actuator, a sensor for detecting an obstacle via contact with the door; and a sensor for detecting the obstacle without contact with the door. The controller interrupts movement of the door when the obstacle is detected. The door has a measurable and selectable opening angle. A hydraulic pump actuates the actuator using fluid pressure, and a hydraulic fuse monitors flow through a bypass valve to detect the contact. A method of opening a side-swinging vehicle door includes recording a door opening angle; detecting a door operating mode, opening the door when one mode is detected; closing the door when a second mode is detected; and opening the door to the recorded angle when a third mode is detected.

14 Claims, 3 Drawing Sheets

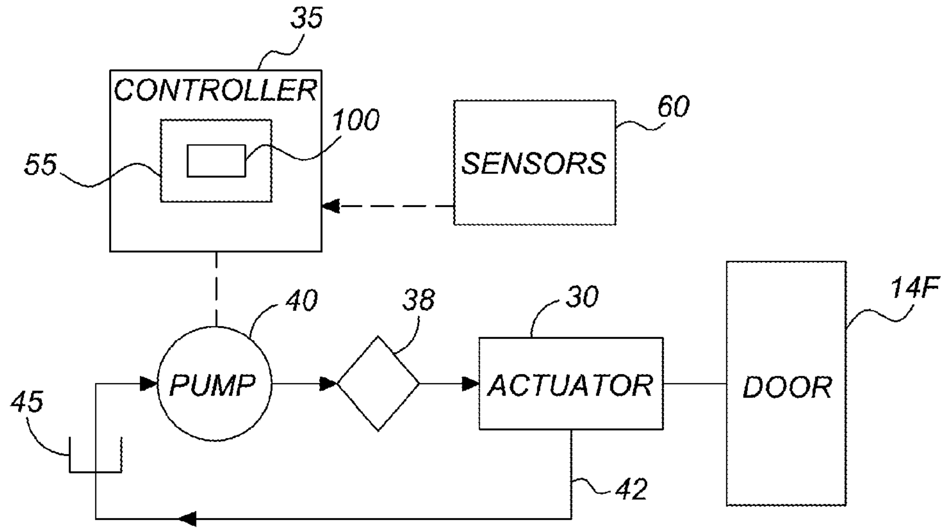
FIG. 2
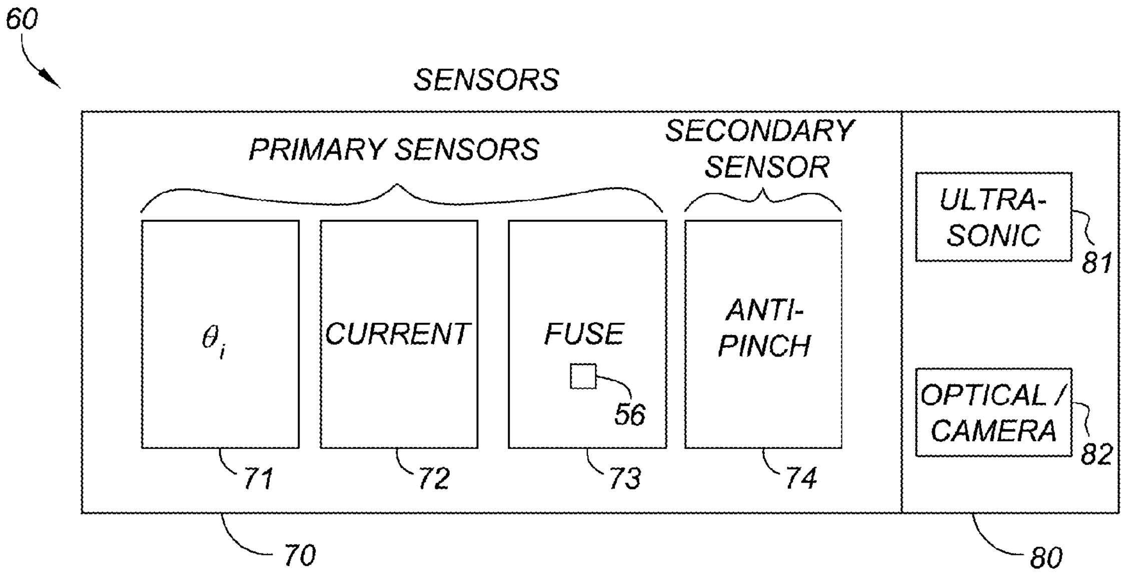
FIG. 3
| MODE | DESCRIPTION |
|---|---|
| 1 | POWER OPEN CYCLE ($\theta_{max}$) |
| 2 | POWER CLOSE CYCLE |
| 3 | STOP-AND-HOLD CYCLE |
| 4 | DISABLE AUTOMATIC FUNCTIONALITY |
| 5 | POWER OPEN CYCLE ($\theta_R$) |
| 6 | $\theta_R$ REPROGRAM OPTION |
FIG. 4

POWER SWINGING SIDE DOOR SYSTEM AND METHOD

TECHNICAL FIELD

The present invention relates to a system and method for selectively powering an automatic swinging vehicle side door to thereby open and close the side door within an occupant-selectable range of door opening angles.

BACKGROUND OF THE INVENTION

Conventional automotive vehicles are typically entered by lifting or pulling an exterior door handle and actuating a lever mechanism positioned within a vehicle door assembly, thereby unlatching the door so that it may freely pivot about a hinge. Modem vehicles may be provided with a remote access device, such as a push-button key fob, that a vehicle occupant may activate a short distance from the vehicle in order to automatically lock or unlock the door. Certain vehicles such as minivans may also include one or more power sliding side doors that slide or roll along a set of tracks or guide slots, and/or a swinging rear hatch door, deck lid, or trunk lid, each of which may be similarly activated from outside the vehicle using a button on a push-button fob. With such remote devices, the vehicle door conveniently opens and closes, and locks or unlocks, at the touch of a button, thus greatly simplifying ingress to and egress from the vehicle, as well as facilitating the loading and unloading of cargo.

Swinging side vehicle doors in particular typically house various integrated connections and other control features, such as power window system components, power folding mirrors, and/or electronic door lock mechanisms, each of which may add mass to the door panel assembly. This added mass may necessitate the exertion of an increased amount of opening or closing force on the door. Also, to facilitate ingress to and egress from the vehicle, side doors generally require a sufficiently wide opening angle, which may make the door more difficult to reach for an occupant seated inside the vehicle. Under certain circumstances, therefore, conventional methods of actuating the door, particularly by an occupant seated inside the vehicle or by an agility- and/or mobility-challenged occupant, may be less than optimal.

SUMMARY OF THE INVENTION

Accordingly, a vehicle is provided with a door angle sensor and a side swinging door having a range of motion defined by a maximum door opening angle, the door further having a variably selectable door opening angle that is programmable by an occupant of the vehicle.

In one aspect of the invention, a controller has an algorithm for moving an actuator in one direction to at least partially open the door, and in another direction to at least partially close the door. An obstacle detection sensor detects the presence of an obstacle positioned within the range of motion of the door, with the controller interrupting the opening and closing of the door when an obstacle is detected.

In another aspect of the invention, a hydraulic pump is in fluid communication with the actuator and is variably controllable by the controller, with the actuator being actuated by hydraulic fluid pressure provided by the hydraulic pump.

In another aspect of the invention, a hydraulic fuse has a bypass valve portion, with the hydraulic sensor being operable for monitoring a flow rate through the bypass valve portion to detect contact between the door and the obstacle.

In another aspect of the invention, an anti-pinch sensor detects a change in electrical output through the anti-pinch sensor, and a current sensor detects a change in electrical power drawn by the hydraulic pump, to detect contact between the door and the obstacle.

In another aspect of the invention, at least one non-contact obstacle sensor detects the presence of the obstacle within the range of motion of the door without contact between the door and the obstacle.

In another aspect of the invention, an automatic swinging side door is provided for use with a vehicle. The door includes an actuator for opening and closing the door; a controller having an algorithm for selectively moving the actuator in one direction to at least partially open the door in response to a first command, and in another direction to at least partially close the door in response to a second command; and at least one obstacle detection sensor configured for detecting the presence of an obstacle within the range of motion of the door. The controller is operable for interrupting the opening and closing of the door when an obstacle is detected.

In another aspect of the invention, a method for automatically opening a vehicle door having a user-selectable door opening angle includes selecting and recording the user-selectable door opening angle, and detecting an occupant-selectable door operating mode. The method includes opening the vehicle door using a controllable actuator when a first mode is detected; closing the vehicle door using the controllable actuator when a second mode is detected; and opening the vehicle door to a recorded user-selectable opening angle using the controllable actuator when a third mode is detected.

In another aspect of the invention, the method includes stopping the movement of the vehicle door when a fourth operating mode is detected, and holding the door at that position until an operating mode is again detected.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 2 is a schematic diagram of a hydraulic pump circuit usable in the vehicle shown in FIG. 1;

FIG. 3 is a schematic illustration of obstacle detection sensors usable with the vehicle shown in FIG. 1;

FIG. 4 is a table describing selectable operating modes usable with an automatic swinging vehicle side door according to the invention.

DESCRIPTION OF THE PREFERRED EMBODIMENTS

Figure 1:
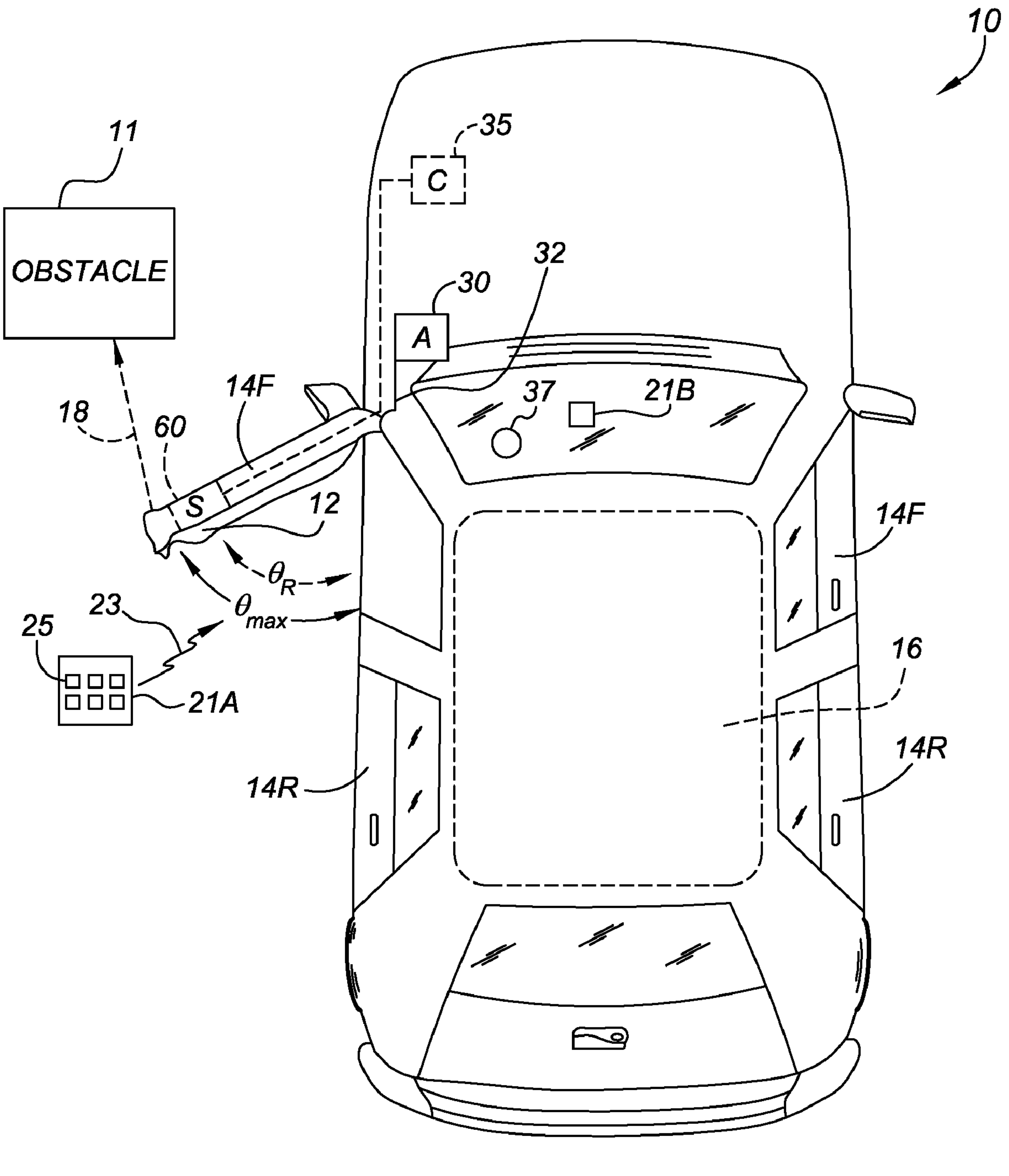
FIG. 1 is a schematic perspective illustration of a vehicle having an automatically actuatable side door according to the invention.

Referring to the drawings wherein like reference numbers correspond to like or similar components throughout the several figures, there is shown in FIG. 1 a vehicle 10 having a pair of front side doors 14F and a substantially similar pair of rear side doors 14R, with side doors 14F, 14R preferably configured as side-hinged or side-swinging doors for access to and egress from a passenger compartment 16. Vehicle 10 has a programmable electronic control module or controller 35 in communication with and adapted or configured for controlling one or more actuating devices or actuators 30, with actuator 30 being operatively connected to side door 14F as represented by connection 32, and adapted to automatically move or operate at least one of side doors 14F, 14R in response to various user or occupant-selected commands, as described in detail hereinbelow.

A remote access device 21A, such as a key fob or other passive entry device capable of emitting a door command signal 23 for opening or closing at least one side door 14F, 14R, and is configured with a plurality of buttons 25 each corresponding to a separate door operating mode, as will be explained in detail hereinbelow with reference to FIG. 4. Likewise, a substantially similar control panel 21B is positioned at one or more convenient locations or positions within passenger compartment 16 of vehicle 10 to thereby provide for ease of use or convenience of activation, with control panel 21B also adapted for automatically opening and/or closing at least one of side doors 14F, 14R from within vehicle 10.

Side door 14F is shown as a front side door of a typical 4-door sedan-style passenger vehicle, and is preferably a conventional side-hinged or "side-swinging" vehicle entry door providing access to and egress from passenger compartment 16. While side door 14F and/or rear side door 14R may be configured for use in conjunction with the invention, for simplicity side door 14F will be referred to exclusively hereinafter.

Side door 14F is configured to open to a maximum opening angle, i.e. $\theta_{max}$, with the quantity $\theta_{max}$ being the maximum available opening angle of side door 14F within the particular design parameters or limitations of side door 14F. Additionally in accordance with the invention, side door 14F preferably includes a user-selectable, variable opening angle, abbreviated as $\theta_R$ and shown in phantom in FIG. 1, that is programmable and recordable into memory 55 (see FIG. 2). The variable opening angle ($\theta_R$) has a value ranging from approximately 0 degrees (i.e. fully closed) up to and including the maximum available opening angle ($\theta_{max}$). Once variable opening angle ($\theta_R$) is recorded within memory 55 of controller 35 (see FIG. 2), it is preferably rapidly accessible therefrom as an available control parameter or value providing a separate customized entry and egress option into and from passenger compartment 16.

For example, a relatively tall user or occupant having sufficient mobility and reach to comfortably grasp an interior door portion 12, such as an arm rest or door handle, when side door 14F is fully open to its maximum available opening angle ($\theta_{max}$), and/or when a user or occupant parking vehicle 10 in an obstacle-free environment, might prefer to select the variable opening angle ($\theta_R$) at a value substantially equal to that of maximum available opening angle ($\theta_{max}$). Likewise, a mobility-challenged occupant, and/or an occupant opening side door 14F within a relatively crowded environment such as a parking garage, might prefer an automatically assisted or powered actuation of side door 14F through an opening angle less than the entire available range of motion of side door 14F, i.e. stopping the motion of side door 14F at a variable opening angle ($\theta_R$) that is less than the maximum available opening angle ($\theta_{max}$).

Because a side-swinging door like side door 14F may encounter various obstacles 11 within the range of motion, sweep, or path of side door 14F when side door 14F is opening or closing, vehicle 10 is preferably further configured with one or more obstacle detection sensors 60, also labeled in FIG. 1 as "S" and described hereinbelow with respect to FIG. 3. Sensors 60 are configured for automatically surveying and assessing the immediately surrounding environment of vehicle 10 prior to and/or during the opening and/or closing side door 14F, as represented in FIG. 1 by arrow 18. Using contact and/or object proximity sensing capabilities, impending and/or actual contact between side door 14F and an obstacle 11 positioned external to vehicle 10 within the range of motion of side door 14F, such as a car, post, object, or person, may be avoided or minimized, with obstacles 11 being sensed in both the opening and closing direction of side door 14F. To provide a warning or alert to an occupant of vehicle 10, an indicator device 37 is preferably positioned within passenger compartment 16 to provide a visible and/or audible alarm or indication when one or more side doors 14F, 14R is about to or actually does make contact an obstacle 11.

Turning to FIG. 2, controller 35 is shown having programmable memory 55, and having a method or control algorithm 100 stored, programmed, or otherwise recorded therein, with algorithm 100 being rapidly accessible by controller 35 for controlling the operation or actuation of side door 14F (also see FIG. 1) in accordance with the invention. Obstacle detection sensors 60 are in communication with controller 35 as described hereinabove. In a preferred embodiment, controller 35 is in electrical communication with a motor-driven hydraulic pump 40, such as a fixed or a variable displacement pump, which is operable for drawing and pressurizing a sufficient supply of hydraulic fluid 42 from a reservoir or sump 45 in response to a signal or command from controller 35. A hydraulic filter 38 may optionally be disposed between pump 40 and actuator 30, and a return flow path is provided from actuator 30 to sump 45 as shown. Hydraulic filter 38 preferably includes pleated particulate removal media sufficient for removing solid contaminants from the hydraulic fluid 42 at a level sufficient to protect actuator 30 within its particular design tolerances, while providing relatively low pressure drop across filter 38.

Turning to FIG. 3, obstacle detection sensors 60 (also see FIG. 1) are shown as a preferred set of contact-type obstacle sensors 70 and a preferred set of non-contact-type obstacle sensors 80. Contact-type obstacle sensors 70 preferably include a door angle sensor 71, a current sensor 72, and/or a hydraulic fuse 73, with sensors 71, 72, and 73 being "primary obstacle detection sensors" as labeled in FIG. 3, and a "secondary obstacle detection sensor" being at least one anti-pinch sensor 74, with each of contact-type sensors 70 being configured to provide information about contact between side door 14F and an obstacle 11 (see FIG. 1).

Instantaneous door angle sensor 71, labeled $\theta_i$ in FIG. 3 for simplicity, is configured to provide information to controller 35 about the precise instantaneous position or location of side door 14F, i.e. the position of side door 14F at any given moment, and by determining the change in instantaneous position over time, is thereby also operable for determining a threshold change in velocity of side door 14F, as would be likely to occur upon contact with an obstacle 11 (see FIG. 1).

Current sensor 72, labeled "current" in FIG. 3 for simplicity, is configured to monitor a change in electrical current drawn by pump 40 (see FIG. 2), such as might be taken or measured within controller 35 or another suitable location. For example, in the event of contact between side door 14F and an obstacle 11 (see FIG. 1), the detected velocity of side door 14F may be reduced to a value of approximately zero. Then, as actuator 30 attempts to move side door 14F against obstacle 11, pump 40 would in turn draw more current, which may then be detected or measured by current sensor 72, with algorithm 100 (see FIGS. 1 and 5) recognizing when a stored threshold current draw is surpassed, i.e. an electrical current condition which may be indicative of contact with an obstacle 1 (see FIG. 1).

Hydraulic fuse 73, labeled simply as "fuse" in FIG. 3 for simplicity, preferably includes a fluid bypass valve portion 56 suitable for reducing fluid pressure across hydraulic fuse 73 by diverting hydraulic fluid 42 (see FIG. 2) as needed in order to prevent further movement of side door 14F in a direction toward obstacle 11 (see FIG. 1). Such a diversion may be detected or measured as needed to determine the presence of an obstacle 11 in the path of side door 14F.

Finally, anti-pinch sensor 74, which is preferably a fiber-optic anti-pinch sensor of the type known in the art, but which may also be an electro-resistive, pneumatic, and/or another suitable anti-pinch strip or other anti-pinch device, is configured to detect contact between side door 14F and obstacle 11 (see FIG. 1). Detection of such contact typically occurs upon opening of side door 14F, but which also may be operate in a closing direction within the scope of the invention. Anti-pinch sensor 74 is configured to provide a measurable or detectable output signal which varies in a known manner in response to a force or pressure exerted on anti-pinch sensor 74, such as would be exerted when side door 14F encounters an obstacle 11.

Still referring to FIG. 3, one or more non-contact-type obstacle sensors 80 are also provided in order to detect the presence of obstacle 11 (see FIG. 1) without requiring physical contact between side door 14F and obstacle 11. Using non-contact-type obstacle sensors 80, an obstacle 11 may be recognized and reacted to before side door 14F contacts obstacle 11. Various sensors may be used in accordance with the invention, such as an ultrasonic sensor 81 and/or an optical/camera sensor 82 configured or adapted for detecting an obstacle 11 without physical contact between obstacle 11 and side door 14F. However, other non-contact-type obstacle sensors 80 may be used in accordance with the invention, such as laser sensors, radar-based sensors, and/or electromagnetic sensors (EMF sensors). Non-contact-type sensors 80 are preferably active in both the opening and closing directions of side door 14F, and operable for detecting obstacles 11 positioned within the range of motion of side door 14F.

Non-contact-type sensors 80 preferably have a sufficiently wide field of view to survey the surrounding area of vehicle 10 and detect, for example, garage doors, vehicles, light posts, pedestrians, trailers, sporting equipment, bicycles, mowers, and the like. Using input from sensors 80, side door 14F may be permitted to open to within a minimum predetermined clearance with respect to obstacle 11, and then stop once that clearance has been reached.

Turning to FIG. 4, a table is shown listing six preferred selectable operating modes for side door 14F (also see FIGS. 1 and 2). Each of the preferred operating modes may be selected by a user or occupant of vehicle 10, for example using access device 21A and/or 21B. Mode 1 preferably defines a "power open" cycle, upon selection of which controller 35 commands the automatic opening of side door 14F to its maximum available opening angle ($\theta_{max}$) Likewise, mode 2 defines a "power close" cycle, upon selection of which controller 35 commands the automatic and complete closing of side door 14F.

Mode 3 provides an intermediate option to modes 1 and 2, with mode 3 defining a "stop-and-hold" cycle, upon selection of which controller 35 commands the interruption of opening or closing of door 14F. For example, an occupant may depress a button 25 (see FIG. 1) a first time from within or without vehicle 10 (see FIG. 1) to initiate opening or closing of side door 14F, and a second time to interrupt or stop further progress or motion of side door 14F, such as when encountering an undetected or unanticipated obstacle 11 (see FIG. 1) while exiting vehicle 10. Mode 3 may be preferred, for example, when parked on a slope or under windy conditions in order to prevent side door 14F from opening too far or too rapidly.

Mode 4 defines a "disable automatic functionality" cycle, upon selection of which controller 35 is rendered temporarily inoperable for the automatically opening or closing of side door 14F until the operating mode is again changed. Mode 4 may be preferable, for example, when encountering numerous obstacles 11 which may render automatic opening or closing of side door 14F impractical, such as while parking in a crowded garage or parking lot.

Mode 5 defines an additional "power open cycle", upon selection of which controller 35 executes a user or occupant-selected and recorded (see Mode 6) variable door opening angle $\theta_R$. As described hereinabove with respect to FIG. 1, variable door opening angle $\theta_R$ may have a value that is less than or equal to the maximum available opening angle of side door 14F, as determined by the design of a particular vehicle 10. For example, using mode 5, an occupant of vehicle 10 with a side door 14F having a maximum opening angle of 75 degrees may set or record the variable opening angle ($\theta_R$) at 45 degrees in order to make it easier to reach interior door portion 12 (see FIG. 1) or to avoid a known obstacle 11 within a garage.

Finally, mode 6 defines a "$\theta_R$ reprogram option", upon selection of which controller 35 receives a new value for variable opening angle ($\theta_R$), such as via programming of controller 35 through a user-friendly interface such as a touch-screen device (not shown) or an additional input device on access device 21A, 21B (see FIG. 1), or through a press-and-hold regime using an attended activation button. Upon receipt, controller 35 records the new value for variable opening angle ($\theta_R$) in memory 55 (see FIG. 2). Once properly recorded, a user or occupant of vehicle 10 may select any of the available door operating modes described hereinabove. Mode 6 may be preferred, for example, when parking in constrained conditions, such as a crowded parking lot, to prevent inadvertent contact between side door 14F (see FIG. 1) and another vehicle in the parking lot.

Figure 5:
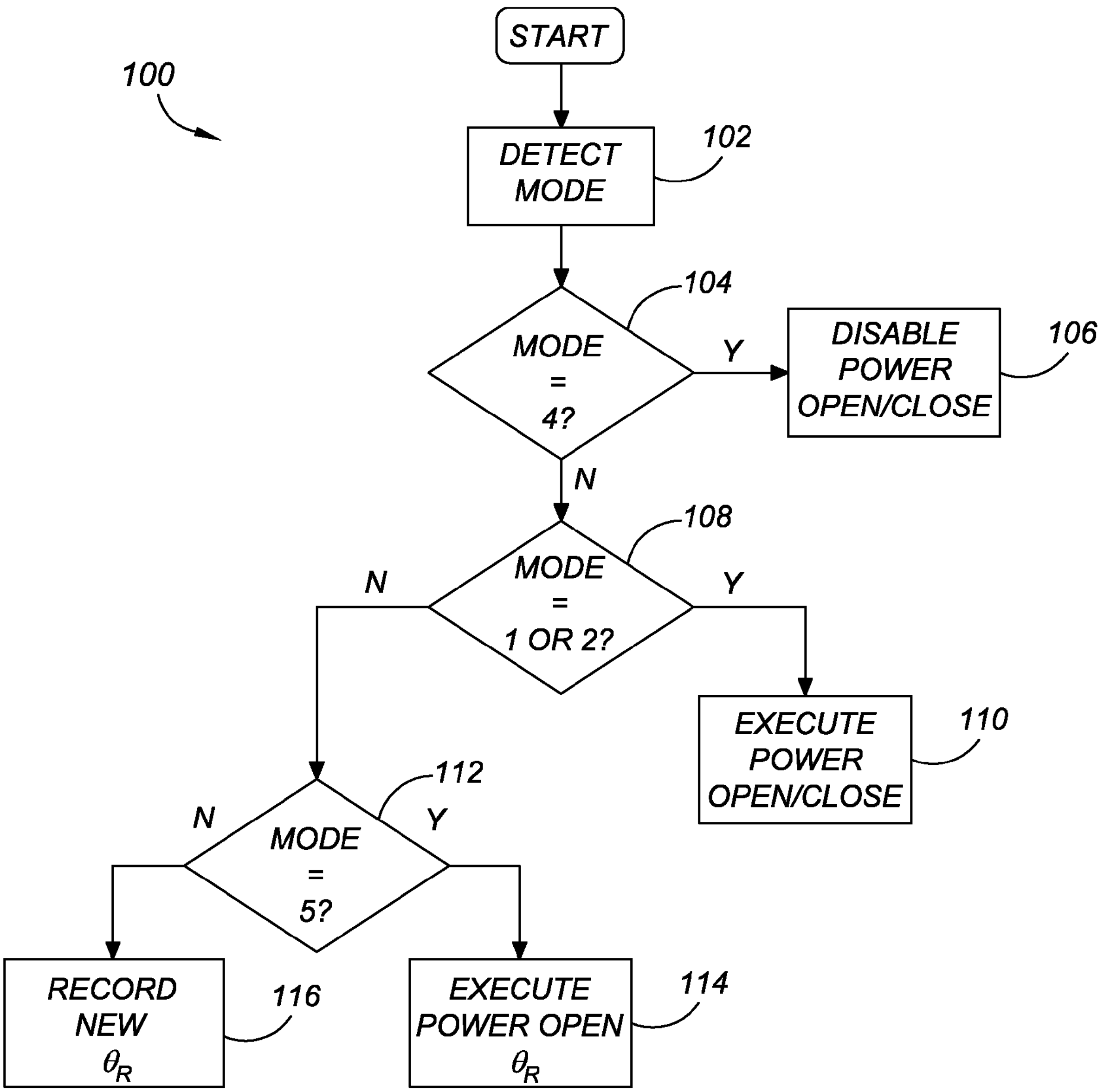
FIG. 5 is a flow chart describing a method of selectively activating the door of FIGS. 1 and 2.

Turning to FIG. 5, algorithm 100 of the invention is shown, with algorithm 100 being programmed or otherwise stored in memory 55 of controller 35 (see FIG. 2). Algorithm 100 begins with step 102, with controller 35 detecting the user-selected door operating mode (see FIG. 4). Once the door operating mode has been detected or otherwise verified, algorithm 100 proceeds to step 104.

At step 104, algorithm 100 determines if the mode detected in the previous step 102 is equal to door operating mode 4, i.e. "disable automatic functionality". If the detected mode is determined to be mode 4, algorithm 100 proceeds to step 106. Otherwise, algorithm 100 proceeds to step 108.

At step 106, algorithm 100 temporarily disables automatic or power open/close functionality of side door 14F and returns to start. Side door 14F is then rendered operable using only available manual methods, such as actuation of an exterior or interior door handle (not shown).

At step 108, algorithm 100 determines whether the door operating mode detected at step 102 is equal to either of modes 1 or 2, i.e. "power open" or "power close" modes, respectively. If either mode 1 or mode 2 is detected, algorithm 100 proceeds to step 110. Otherwise, algorithm 100 proceeds to step 112.

At step 110, algorithm 100 executes the automatic or power open/close cycle as detected at step 102. As previously described hereinabove, "power open" and "power close" refer to the full opening and full closing of side door 14F (see FIG. 1), respectively.

At step 112, algorithm 100 determines whether the door operating mode detected at step 102 is equal to mode 5, i.e. the alternate "power open ($\theta_R$)" option. If mode 5 is detected, algorithm 100 proceeds to step 114. If mode 5 is not detected, algorithm 100 proceeds to step 116.

At step 114, algorithm 100 accesses the previously recorded value for variable opening angle ($\theta_R$) that is resident in memory 55 (see FIG. 2). Algorithm 100 then executes the opening of side door 14F (see FIG. 1) to the variable door opening angle ($\theta_R$).

At step 116, algorithm 100 records a user-selectable value for variable opening angle $\theta_R$ in memory 55. Once properly recorded, the value of variable opening angle ($\theta_R$) is then readily accessible by controller 35 in response to selection of one of the available door operating modes 1-5 (see FIG. 4) as described hereinabove.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:

a plurality of obstacle detection sensors, including a door angle sensor;

a door having a range of motion defining a maximum door opening angle, said door further having a variable door opening angle that is selectable by a user of the vehicle from approximately 0 degrees up to the maximum door opening angle, said door angle sensor being operable for determining a change in an instantaneous position of said door over time to determine a threshold change in velocity of said door, and to thereby detect an obstacle positioned within said range of motion in a first manner;

an actuator adapted for alternately opening and closing said door; and a controller having an algorithm for moving said actuator in one direction to at least partially open said door to said variable door opening angle in response to a first command, and for moving said actuator in another direction to at least partially close said door in response to a second command;

wherein said controller is operable for interrupting either of said opening and said closing when said presence of said obstacle is detected in said first manner.

2. The vehicle of claim 1, further comprising a hydraulic pump in fluid communication with said actuator, wherein said actuator is actuated using hydraulic fluid pressure provided by said hydraulic pump.

3. The vehicle of claim 2, wherein said plurality of obstacle detection sensors includes a hydraulic fuse having a bypass valve portion, wherein said hydraulic fuse is a contact-type obstacle sensor operable for monitoring a change in flow rate of hydraulic fluid flowing through said bypass valve portion upon contact between said door and said obstacle to thereby determine said presence of said obstacle in a second manner.

4. The vehicle of claim 2, wherein said plurality of obstacle detection sensors includes at least one of an anti-pinch sensor and a current sensor configured to detect a change in electrical power drawn by said hydraulic pump, and to thereby determine said presence of said obstacle in a third manner.

5. The vehicle of claim 1, wherein said plurality of obstacle detection sensors includes at least one non-contact obstacle sensor configured to detect said presence of said obstacle in a second manner without contact between said door and said obstacle.

6. The vehicle of claim 1, further comprising an indicator device operable for providing at least one of a visible and an audible warning when said presence of said obstacle is detected.

7. The vehicle of claim 1, wherein said controller is configured with a plurality of selectable operating modes for said door, including at least a first mode commanding an opening of said door to said maximum door opening angle, a second mode commanding an opening of said door to said variable door opening angle selected by said user, a third mode commanding a stop-and-hold cycle that interrupts a motion of said door, and a fourth mode allowing said user to reprogram said variable opening angle.

8. The vehicle of claim 1, wherein said plurality of obstacle detection sensors further includes each of: a current sensor, a hydraulic fuse, an anti-pinch sensor, an ultrasonic sensor, and an optical sensor each adapted to detect said obstacle in a different manner.

9. An automatic door assembly for use with a vehicle comprising:

a swinging side door having a range of motion defining a maximum door opening angle;

an actuator adapted for opening and closing said swinging side door;

a controller having an algorithm for selectively moving said actuator in one direction to at least partially open said swinging side door to a variable door opening angle that is selectable by a user of the vehicle from approximately 0 degrees up to the maximum door opening angle in response to a first command, and at least partially in another direction to thereby close said swinging side door in response to a second command;

at least one contact-type obstacle detection sensor configured for detecting the presence of an obstacle positioned external to the vehicle upon contact between said swinging side door and said obstacle, including a door angle sensor adapted for determining a change in an instantaneous position of said swinging side door over time to determine a threshold change in velocity of said swinging side door; and at least one non-contact obstacle sensor configured for detecting the presence of said obstacle within said range of motion of said swinging side door without contact between said swinging side door and said obstacle;

wherein said controller is operable for interrupting both of said opening and said closing when said presence of said obstacle is detected.

10. The assembly of claim 9, further including a door angle sensor for determining an instantaneous door opening angle of said swinging side door, and for calculating a change in velocity of said swinging side door based on a rate of change of said instantaneous door opening angle to thereby detect said presence of said obstacle.

11. The assembly of claim 9, further comprising a hydraulic pump in fluid communication with said actuator, wherein said actuator is actuated using a variable hydraulic fluid pressure provided by said hydraulic pump.

12. The assembly of claim 11, further comprising a hydraulic fuse having a bypass valve portion, wherein said at least one contact-type obstacle detection sensor is said hydraulic fuse and is operable for monitoring a change in flow of hydraulic fluid through said bypass valve portion upon contact between said swinging side door and said obstacle.

13. The assembly of claim 9, wherein said at least one contact-type obstacle detection sensor includes an anti-pinch sensor having a detectable output that varies in response to resistance provided by contact between said swinging side door and said obstacle.

14. The assembly of claim 9, further comprising an indicator device operable for providing at least one of a visible and an audible warning when said presence of said obstacle is detected.

* * * * *